(12) United States Patent
Zarakas et al.

(10) Patent No.: US 11,315,103 B2
(45) Date of Patent: *Apr. 26, 2022

(54) AUTOMATED BLUETOOTH PAIRING

(71) Applicant: Capital One Services, LLC, McLean, VA (US)

(72) Inventors: James Zarakas, Centreville, VA (US); Saleem Sangi, Ellicott City, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 641 days.

This patent is subject to a terminal disclaimer.

(21) Appl. No.: 15/391,949

(22) Filed: Dec. 28, 2016

(65) Prior Publication Data

US 2017/0118645 A1   Apr. 27, 2017

Related U.S. Application Data

(63) Continuation of application No. 15/098,973, filed on Apr. 14, 2016, now Pat. No. 10,880,741.
(Continued)

(51) Int. Cl.
*G06Q 20/32* (2012.01)
*H04W 12/06* (2021.01)
(Continued)

(52) U.S. Cl.
CPC ....... *G06Q 20/3226* (2013.01); *G06Q 20/327* (2013.01); *G06Q 20/34* (2013.01);
(Continued)

(58) Field of Classification Search
CPC .... G06Q 20/341; G06Q 20/367; G06Q 20/40; H04W 4/027; H04W 4/029; H04W 4/80; C08K 3/26
See application file for complete search history.

(56) References Cited

U.S. PATENT DOCUMENTS

| 5,940,510 A | 8/1999 | Curry et al. |
| 5,949,880 A | 9/1999 | Curry et al. |

(Continued)

FOREIGN PATENT DOCUMENTS

| CN | 102413442 B | 1/2015 |
| EP | 1752937 A1 | 2/2007 |

(Continued)

OTHER PUBLICATIONS

A. Young, "A weakness in smart card PKI certification," IEEE Systems, Man and Cybernetics SocietyInformation Assurance Workshop, 2003., 2003, pp. 30-34, doi: 10.1109/SMCSIA.2003.1232397. (Year: 2003).*

(Continued)

*Primary Examiner* — Neha Patel
*Assistant Examiner* — Jahed Ali
(74) *Attorney, Agent, or Firm* — Troutman Pepper Hamilton Sanders LLP; Christopher J. Forstner; John A. Morrissett (57) ABSTRACT

This disclosure relates to creating a Bluetooth and/or BLE connection between two devices without using a UUID and/or MAC address. For example, a first device storing a private key may enter advertising mode to create a Bluetooth/BLE connection. An advertising packet (e.g., advertising channel packet data unit (PDU) may be transmitted (e.g., in encrypted format). A second device may enter scanning or initiator mode and may receive the advertising packet. A second device may request that a user log into an account associated with the first device (e.g., a customer account, a financial account, an employee account, and/or the like) in order to initiate a Bluetooth/BLE connection. A second device user may enter login credentials via the second device, which may then be transmitted to a backend system. A backend system may receive and validate the (Continued)

login credentials and, in response, transmit a public key to the second device. The public key may be transmitted in an encrypted format. A second device may receive the public key and may use the public key to perform a public/private key handshake in order to validate the first device. The handshake may then be validated by the first device and a Bluetooth and/or BLE connection may be created.

16 Claims, 5 Drawing Sheets

Related U.S. Application Data (60) Provisional application No. 62/270,476, filed on Dec. 21, 2015, provisional application No. 62/147,568, filed on Apr. 14, 2015.

(51) Int. Cl.
  *H04W 12/04* (2021.01)
  *H04L 29/06* (2006.01)
  *G06Q 20/38* (2012.01)
  *G06Q 20/34* (2012.01)
  *G06Q 30/02* (2012.01)
  *H04W 12/0431* (2021.01)
  *H04L 9/08* (2006.01)
  *H04W 84/18* (2009.01)

(52) U.S. Cl.
  CPC ....... *G06Q 20/341* (2013.01); *G06Q 20/3829* (2013.01); *G06Q 30/0267* (2013.01); *H04L 9/0861* (2013.01); *H04L 63/0492* (2013.01); *H04W 12/04* (2013.01); *H04W 12/0431* (2021.01); *H04W 12/06* (2013.01); *G06Q 2220/00* (2013.01); *H04L 63/0442* (2013.01); *H04L 2463/121* (2013.01); *H04W 84/18* (2013.01)

(56) References Cited

U.S. PATENT DOCUMENTS

| | | | |
|---|---|---|---|
| 6,105,013 A | 8/2000 | Curry et al. | |
| 6,237,095 B1 | 5/2001 | Curry et al. | |
| 6,704,608 B1 | 3/2004 | Azuma | |
| 7,243,853 B1 | 7/2007 | Levy et al. | |
| 7,318,550 B2 | 1/2008 | Bonalle et al. | |
| 7,587,756 B2 | 9/2009 | Peart et al. | |
| 7,597,265 B2 * | 10/2009 | Bonalle ................ G06Q 20/105 235/487 |
| 7,729,986 B1 | 6/2010 | Hoffman et al. | |
| 7,784,687 B2 | 8/2010 | Mullen et al. | |
| 7,793,845 B2 * | 9/2010 | Bonalle ............... G06Q 20/3674 235/487 |
| 7,793,851 B2 | 9/2010 | Mullen | |
| 7,798,415 B1 | 9/2010 | Bates et al. | |
| 7,828,220 B2 * | 11/2010 | Mullen ................ G06K 19/077 235/380 |
| 7,874,492 B2 * | 1/2011 | Levy ....................... G06F 21/77 235/492 |
| 7,931,195 B2 * | 4/2011 | Mullen ................ G06K 19/077 235/375 |
| 7,946,501 B2 | 5/2011 | Borracci | |
| 7,953,671 B2 | 5/2011 | Bishop et al. | |
| 7,954,705 B2 | 6/2011 | Mullen | |
| 8,011,577 B2 | 9/2011 | Mullen et al. | |
| 8,016,191 B2 | 9/2011 | Bonalle et al. | |
| 8,019,684 B2 | 9/2011 | Hoffman et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,078,532 B2 | 12/2011 | Hoffman et al. | |
| 8,082,211 B2 | 12/2011 | Hoffman et al. | |
| 8,095,113 B2 | 1/2012 | Kean et al. | |
| 8,172,148 B1 | 5/2012 | Cloutier et al. | |
| 8,215,563 B2 | 7/2012 | Levy et al. | |
| 8,249,654 B1 | 8/2012 | Zhu | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,308,059 B2 | 11/2012 | Granucci et al. | |
| 8,322,623 B1 | 12/2012 | Mullen et al. | |
| 8,348,172 B1 | 1/2013 | Cloutier et al. | |
| 8,360,322 B2 | 1/2013 | Bonalle et al. | |
| 8,382,000 B2 | 2/2013 | Mullen et al. | |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,417,631 B2 | 4/2013 | Hoffman et al. | |
| 8,424,773 B2 | 4/2013 | Mullen et al. | |
| 8,429,085 B2 | 4/2013 | Faith et al. | |
| 8,459,548 B2 | 6/2013 | Mullen et al. | |
| 8,485,437 B2 | 7/2013 | Mullen et al. | |
| 8,485,446 B1 | 7/2013 | Mullen et al. | |
| 8,489,513 B2 | 7/2013 | Bishop et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 | 11/2013 | Lambeth et al. | |
| 8,590,796 B1 | 11/2013 | Cloutier et al. | |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,628,022 B1 | 1/2014 | Rhoades et al. | |
| 8,668,143 B2 | 3/2014 | Mullen et al. | |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,805,746 B2 | 8/2014 | Hoffman et al. | |
| 8,811,959 B2 | 8/2014 | Conner et al. | |
| 8,814,050 B1 | 8/2014 | Mullen et al. | |
| 8,820,638 B1 | 9/2014 | Cotter et al. | |
| 8,827,153 B1 | 9/2014 | Rhoades et al. | |
| 8,870,081 B2 | 10/2014 | Olsen et al. | |
| 8,874,913 B1 * | 10/2014 | Monica ............. H04W 12/04031 713/168 |
| 8,875,999 B2 | 11/2014 | Mullen et al. | |
| 8,876,011 B2 | 11/2014 | Olsen et al. | |
| 8,888,009 B1 | 11/2014 | Mullen | |
| 8,931,703 B1 | 1/2015 | Mullen et al. | |
| 8,944,333 B1 | 2/2015 | Mullen et al. | |
| 8,955,744 B2 | 2/2015 | Granucci et al. | |
| 8,960,545 B1 | 2/2015 | Batra | |
| 8,973,824 B2 | 3/2015 | Mullen et al. | |
| 9,306,753 B1 * | 4/2016 | Vandervort ............ H04L 9/3247 |
| 9,602,277 B2 * | 3/2017 | Marlow ............. H04W 12/0401 |
| 10,021,087 B2 | 7/2018 | Karimzadeh et al. | |
| 10,110,569 B1 * | 10/2018 | Coelho .................... H04L 67/06 |
| 11,070,364 B2 * | 7/2021 | Tang ....................... H04L 9/0844 |
| 2002/0095587 A1 | 7/2002 | Doyle et al. | |
| 2003/0051149 A1 * | 3/2003 | Robert ............... H04N 21/43615 713/189 |
| 2003/0061477 A1 * | 3/2003 | Kahn ..................... H04N 7/1675 713/150 |
| 2004/0161277 A1 * | 8/2004 | Gassho .................. G06F 21/608 400/76 |
| 2005/0228997 A1 * | 10/2005 | Bicker ................... H04L 63/062 713/171 |
| 2006/0205129 A1 | 9/2006 | Sato et al. | |
| 2006/0213972 A1 | 9/2006 | Kelly et al. | |
| 2010/0241867 A1 * | 9/2010 | Brown ................... G07F 7/1025 713/185 |
| 2011/0072503 A1 | 3/2011 | Tan et al. | |
| 2011/0080774 A1 | 4/2011 | Saito et al. | |
| 2011/0145897 A1 * | 6/2011 | Tyree ..................... G06F 21/42 726/6 |

(56) References Cited

U.S. PATENT DOCUMENTS

| | | |
|---|---|---|
| 2011/0202466 A1 | 8/2011 | Carter |
| 2011/0222336 A1 | 9/2011 | Kato |
| 2011/0225417 A1* | 9/2011 | Maharajh ............ H04L 65/4076 713/150 |
| 2012/0109735 A1 | 5/2012 | Krawczewicz et al. |
| 2012/0185398 A1* | 7/2012 | Weis .................... G06Q 20/401 705/75 |
| 2012/0254038 A1 | 10/2012 | Mullen |
| 2012/0276847 A1* | 11/2012 | Peterson ............... G01S 5/0027 455/41.2 |
| 2012/0328101 A1* | 12/2012 | Lakshminarayanan ...................... H04L 63/0823 380/258 |
| 2013/0030997 A1* | 1/2013 | Spodak ................ G06Q 20/341 705/41 |
| 2013/0191288 A1 | 7/2013 | Hoffman et al. |
| 2013/0217152 A1 | 8/2013 | Mullen et al. |
| 2013/0218760 A1 | 8/2013 | Faith et al. |
| 2013/0282588 A1* | 10/2013 | Hruska .................. G06Q 20/40 705/67 |
| 2013/0311363 A1 | 11/2013 | Ramaci et al. |
| 2013/0320080 A1 | 12/2013 | Olsen et al. |
| 2013/0320081 A1 | 12/2013 | Olson et al. |
| 2014/0001269 A1 | 1/2014 | Hartwick et al. |
| 2014/0006277 A1 | 1/2014 | Rao |
| 2014/0026213 A1 | 1/2014 | Antebi et al. |
| 2014/0117094 A1 | 5/2014 | Workley et al. |
| 2014/0129435 A1 | 5/2014 | Pardo et al. |
| 2014/0138435 A1 | 5/2014 | Khalid |
| 2014/0144984 A1 | 5/2014 | Olson et al. |
| 2014/0164154 A1 | 6/2014 | Ramaci |
| 2014/0175170 A1 | 6/2014 | Bowers |
| 2014/0188733 A1* | 7/2014 | Granbery ........... G06Q 20/3278 705/64 |
| 2014/0203902 A1 | 7/2014 | Shippee et al. |
| 2014/0210589 A1 | 7/2014 | Grace |
| 2014/0233166 A1 | 8/2014 | O'Shea |
| 2014/0256251 A1 | 9/2014 | Caceres et al. |
| 2014/0279476 A1 | 9/2014 | Hua |
| 2014/0310184 A1 | 10/2014 | Hoffman et al. |
| 2014/0310526 A1 | 10/2014 | Pahl et al. |
| 2014/0317410 A1* | 10/2014 | Yamaguchi ............. H04L 63/08 713/171 |
| 2014/0339315 A1 | 11/2014 | Ko |
| 2014/0379583 A1 | 12/2014 | Hoffman et al. |
| 2015/0004934 A1 | 1/2015 | Qian et al. |
| 2015/0006378 A1 | 1/2015 | Blythe |
| 2015/0006887 A1* | 1/2015 | Brand .................... G06F 21/33 713/156 |
| 2015/0012440 A1 | 1/2015 | Kelley et al. |
| 2015/0012443 A1* | 1/2015 | Bhat .................... G06Q 20/108 705/50 |
| 2015/0032635 A1 | 1/2015 | Guise |
| 2015/0073983 A1 | 3/2015 | Bartenstein et al. |
| 2015/0080077 A1 | 3/2015 | Miller et al. |
| 2015/0113276 A1 | 4/2015 | Day et al. |
| 2015/0113277 A1* | 4/2015 | Harkins ................ H04L 9/0825 713/171 |
| 2015/0172059 A1* | 6/2015 | Tredoux .............. H04L 63/0492 713/176 |
| 2016/0174069 A1 | 6/2016 | Bruner et al. |
| 2016/0307190 A1 | 10/2016 | Zarakas et al. |
| 2016/0309323 A1* | 10/2016 | Zarakas ................ H04W 12/04 |
| 2017/0118196 A1* | 4/2017 | Ponsini ................ H04L 9/3265 |
| 2017/0118645 A1* | 4/2017 | Zarakas ............... H04W 12/06 |
| 2017/0366917 A1* | 12/2017 | Chen .................... H04L 63/0815 |
| 2019/0253260 A1* | 8/2019 | Uehara ................... G06F 21/64 |

FOREIGN PATENT DOCUMENTS

| | | | |
|---|---|---|---|
| JP | 2007184715 A | 7/2007 | |
| WO | 2016168457 A1 | 10/2016 | |
| WO | 2016168475 A1 | 10/2016 | |
| WO | WO-2016168457 A1 * | 10/2016 | ................ H02J 7/00 |
| WO | WO-2016168475 A1 * | 10/2016 | ............. G06F 21/77 |

OTHER PUBLICATIONS

G. Me and A. Schuster, "A secure and reliable local payment system," VTC—2005—Fall. 2005 IEEE 62nd Vehicular Technology Conference, 2005., 2005, pp. 2761-2765, doi: 10.1109/VETECF.2005.1559053. (Year: 2005).*

Extended European Search Report, Application No. 17211210.4-1202, dated May 23, 2018, nine pages.

Extended European Search Report, Application No. 17211216.1-1202, dated Jun. 4, 2018, nine pages.

Notification of Transmittal of The International Search Report and The Written Opinion of the International Searching Authority from Application No. PCT/US2016/027449 dated Jul. 15, 2016.

Extended European Search Report in related EP Application No. 16780709.8, dated Oct. 18, 2018.

Final Office Action in related U.S. Appl. No. 15/098,973 dated Jun. 22, 2020.

* cited by examiner

AUTOMATED BLUETOOTH PAIRING

CROSS REFERENCE TO RELATED APPLICATIONS

This application is a continuation of, and claims priority under 35 U.S.C. § 120 to, U.S. patent application Ser. No. 15/098,973, filed on Apr. 14, 2016, which claims the benefit of U.S. Provisional Application No. 62/270,476, entitled "Automated Bluetooth Pairing," filed Dec. 21, 2015 and U.S. Provisional Application No. 62/147,568, entitled "A System, Method, and Apparatus for a Dynamic Transaction Card," filed Apr. 14, 2015. The entire contents of these applications are incorporated herein by reference.

This application is related to and U.S. Application Ser. No. 14/338,423, entitled "System and Method for Exchanging Data with Smart Cards" filed Jul. 23, 2014, which claims the benefit of U.S. Provisional Application No. 61/857,443 filed on Jul. 23, 2013. The entire contents of these applications are incorporated herein by reference.

FIELD OF THE DISCLOSURE

The present disclosure relates to a user-specific, automated Bluetooth pairing of devices using a pre-stored private key in a first device and downloading a public key at a second device. In this manner, the public/private keys may be used to pair the first device with the second device without using a media access control (MAC) address or a universally unique identifier (UUID).

BACKGROUND OF THE DISCLOSURE

Currently when pairing two devices using Bluetooth technology, one device is in advertising mode and one device is in scanning mode. The advertising mode allows a device to transmit advertisement packets via the appropriate channels to pair with a device in scanning or initiator mode. The device in scanning or initiator mode scans the appropriate channels for advertising packets and, upon detection of a packet, may send out a connection request. An advertising packet, or advertising channel packet data unit (PDU), may include identifiers such as a media access control (MAC) address and/or a universally unique identifier (UUID).

However, simply using a MAC address and/or a UM does not provide a secure way of connecting two devices such that the connection is user-specific and not simply a generic connection between two devices. In this manner, a Bluetooth or Bluetooth Low Energy (BLE) connection is not a secure connection. Moreover, not all devices provide access to a MAC address for pairing purposes due to techniques that may be used in MAC address spoofing.

Additionally, current key generation, such as that used in Transport Layer Security (TLS) requires significant processing needs that small electronic devices with limited battery power are unable to mirror.

These and other drawbacks exist.

SUMMARY OF THE DISCLOSURE

Various embodiments of the present disclosure provide a user-specific, automated Bluetooth pairing of devices using a pre-stored private key in a first device and downloading a public key in a second device. In this manner, the public/private keys may be used to pair the first device with the second device without using a MAC address or a UUID.

As referred to herein, first device may include a device including a Bluetooth or BLE antenna to connect to a second device via a Bluetooth or BLE connection. The first device may include a preprogrammed microcontroller, secure element which may contain a microprocessor, applet, and/or memory, which may include preprogrammed data. Preprogrammed data may include a private ky to be used for Bluetooth/BLE connections.

A first device also may store instructions to encrypt and/or encode data being transmitted from the first device. A first device may store instructions to decrypt and/or decode data received at the first device. A first device may store encryption/encoding/decryption/decoding instruction in a secure element or a secure microprocessor. For example, where a first device includes an EMV chip, encryptions/encoding/decryption/decoding instructions may be stored within the EMV chip. A first device may store instructions to validate a public/private key handshake between the first device and a second device to pair the first device and second device via a Bluetooth/BLE connection.

As referred to herein, a backend system may include a system associated with the preprogramming of the microcontroller. For example, a backend system may generate a private/public key pair and associate the private/public key pair with a particular account. A backend system may store preprogrammed data such as private keys, UUIDs, and/or other device identifiers that may be associated with a particular account. The backend system may store public keys, account numbers, account names, user names, passwords, and other account data associated with a particular account. The storage may associate the private keys, other device identifiers, public keys, account numbers, account names, user names, passwords, and/or other account data. A backend system may store any data as a hash value.

As referred to herein, a second device may include a device able to connect with the first device via a Bluetooth or BLE connection. The second device may include a microprocessor, microcontroller, or other memory programmed to allow a user to log into an account, connect with a backend system to retrieve a public key associated with the account, and validate an advertising PDU using public/private key encryption technology.

In an example embodiment, a first device storing a private key may enter advertising mode to create a Bluetooth/BLE connection. An advertising packet (e.g., advertising PDU) may be transmitted (e.g., in encrypted format). A second device may enter scanning or initiator mode and may receive the advertising packet. A second device may request that a user log into an account associated with the first device (e.g., a customer account, a financial account, an employee account, and/or the like) in order to initiate a Bluetooth/BLE connection. A second device user may enter login credentials via the second device, which may then be transmitted to a backend system. A backend system may receive and validate the login credentials and, in response, transmit a public key to the second device. The public key may be transmitted in an encrypted format. A second device may receive the public key and may use the public key to perform a public/private key handshake in order to validate the first device. The handshake may then be validated by the first device.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving a user-specific, automated Bluetooth pairing of devices using a pre-stored private key in a first device and downloading a public key at a second device. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A dynamic transaction card and mobile device are used as examples for the disclosure. The disclosure is not intended to be limited to dynamic transaction cards or mobile devices only. For example, many other electronic devices may utilize user-specific, automated Bluetooth pairing of devices using a pre-stored private key in a first device and downloading a public key at a second device.

Figure 1:
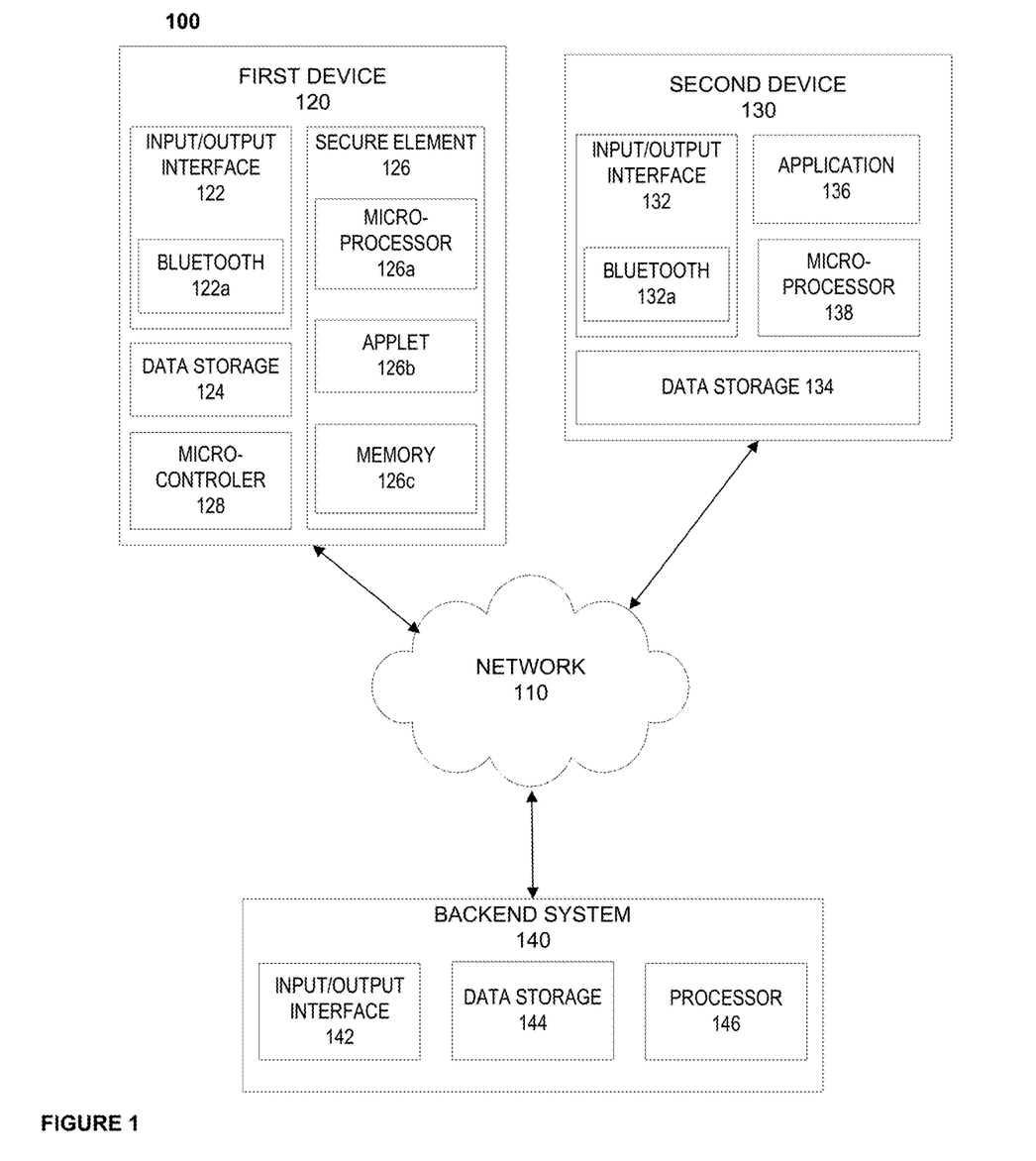
FIG. 1 depicts an example system incorporating a user-specific, automated Bluetooth pairing of devices using a pre-stored private key in a first device and downloading a public key in a second device, according to embodiments of the disclosure.

FIG. 1 depicts an example system 100 for accomplishing a user-specific, automated Bluetooth pairing of devices via a pre-stored private key in a first device and a downloaded public key at a second device. As shown in FIG. 1, an example system 100 may include a first device 120, a second device 130, and/or a backend systems 140 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS) Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

First device 120, second device 130, and/or backend system 140 may include, for example, one or more mobile devices, such as, for example, personal digital assistants (PDA), tablet computers and/or electronic readers e.g. Kindle Fire, Playbook, Touchpad, etc.), wearable devices (e.g., Google Glass), telephony devices, smartphones, cameras, music playing devices (e.g., iPod, etc.), televisions, set-top-box devices, and the like.

First device 120, second device 130, and/or backend system 140 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, second device 130 and backend system 140 may include, for example, components illustrated in FIG. 4.

First device 120, second device 130, and/or backend system 140 may include at least one central processing unit (CPU), which may be configured to execute computer program instructions to perform various processes and methods. First device 120, second device 130, and/or backend system 140 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

First device 120, second device 130, and/or backend system 140 may further include, for example, a processor, which may be several processors, a single processor, or a single device having multiple processors. Although depicted as single elements, it should be appreciated that according to one or more embodiments, first device 120, second device 130, and/or backend system 140 may comprise a plurality of first devices 120, second devices 130, and/or backend systems 140.

First device 120, second device 130, and/or backend system 140 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

As shown in FIG. 1, first device 120, second device 130, and/or backend system 140 may include various components. These components may be understood to refer to computer executable software, firmware, hardware, and/or various combinations thereof. It is noted that where a component includes software and/or firmware, the components is configured to affect the hardware elements of an associated system is further noted that the components shown and described herein are intended as examples. The components nay be combined, integrated, separated, or duplicated to support various applications. Also, a function described herein as being performed at a particular component be performed at one or more other components and by one or more other devices instead of or in addition to the function performed at the particular component.

As depicted in FIG. 1, system 100 may include an a first device 120. A first device 120 may include an input/output interface 122 comprising Bluetooth technology (e.g., Bluetooth antenna, BLE antenna, and/or the like); data storage 124, a secure element 126 comprising a microprocessor 126a, an applet 126b, and/or memory 126c; and/or a microcontroller 128.

A first device 120 may be able to communicate with, for example, a second device 130 using RFID, Bluetooth, NFC, WiFi Direct, and/or other related technologies. For example, communications between a first device 120 and a second device 130 may include methods, systems, and devices as described in U.S. patent application Ser. No. 14/338,423 filed on Jul. 23, 2014, the entire contents of which is incorporated herein by reference.

A first device 120 may include a preprogrammed microcontroller 128. For example, a preprogrammed microcontroller 128 may include manufacturer programming and/or third-party programming that may be issued to microcontroller 128 before the first device is issued to an end user. Microcontroller 128 may also include user-specific programming (e.g., settings, application, etc.) provided via the user and/or another user device (e.g., smart phone, tablet, computer, and the like). The user-specific programming may be prohibited from writing to the preprogrammed content on the microcontroller 128. Preprogrammed data may include a private key to be used for Bluetooth/BLE connections.

A first device 126 may include a secure element having a microprocessor 126a, applet 126b, and/or memory 126c. A secure element 126 may include, for example, an EMV chip. The memory 126c and/or applet 126b may be preprogrammed with manufacturer programming and/or third-party programming that may be issued to the memory before the first device is issued to an end user. The memory 126c and/or applet 126b may also include user-specific programming (e.g., settings, application, etc.) provided via the user and/or another user device (e.g., smart phone, tablet, computer, and the like). The user-specific programming may be prohibited from writing to the preprogrammed content on the memory 126c and/or applet 126b. Preprogrammed data may include a private key to be used for Bluetooth/BLE connections.

Input/output interface 122 may include for example, I/O devices, which may be configured to provide input and/or output to/from first device 120 (e.g., keyboard, mouse, display, speakers, printers, modems, network cards, etc.). Input/output interface 122 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of first device 120, and a bus that allows communication among the various components of first device 120. Input/output interface 122 may include Bluetooth/BLE technology 122a, such as a Bluetooth and/or BLE antenna, Bluetooth and/or BLE APIs, and/or the like. Input/output interface 122 may include a display, which may include for example output devices, such as a printer, display screen (e.g., monitor, television, and the like), speakers, projector, and the like. Although not shown, first device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Data storage 124 may include random access memory (RAM) and read only memory (ROM), which may be configured to access and store data and information and computer program instructions, such as firmware and/or other applications. Data storage 124 may also include storage media or other suitable type of memory (e.g., such as, for example, RAM, ROM, programmable read-only memory (PROM), erasable programmable read-only memory (EPROM), electrically erasable programmable read-only memory (EEPROM), any type of tangible and non-transitory storage medium), where the files that comprise an operating system, application programs, private keys, and/or data files may be stored.

A secure element 126 may include a secure microprocessor, such as a microprocessor chip, a EuroPay-MasterCard-Visa (EMV) chip, and/or the like. Secure element 126 may include a microprocessor 126a, an applet 126b, and/or a memory 126c. Microprocessor 126a may include a random number generator, a hash generator, and/or an encryption/decryption signature engine. An applet 126b may include instructions stored therein that, when executed, initiate a Bluetooth and/or BLE connect on as described herein. Memory 126c may store at least one private key used to validate and/or create a Bluetooth and/or BLE connection with a second device. Microprocessor 128 may store and/or execute firmware and/or software applications stored in first device 120.

Second device 130 may include an input/output interface 132 comprising Bluetooth and/or BLE technology 132a, data storage 134, a software application 136, and/or a microprocessor 138.

Input/output interface 132 may include for example, I/O devices, which may be configured to provide input and/or output to/from second device 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of second device 130, and a bus that allows communication among the various components of second device 130. Input/output interface 132. may include Bluetooth/BLE technology 132a, such as a Bluetooth and/or BLE antenna, Bluetooth and/or BLE APIs, and/or the like. Input/output interface 132 may include a display, which may include for example output devices, such as a printer, display screen (e.g., monitor, television, and the like), speakers, projector, and the like. Although not shown, second device 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Data storage 134 may include random access memory (RAM) and read only memory (RUM), which may be configured to access and store data and information and computer program instructions, such as firmware and/or other applications. Data storage 134 may also include storage media or other suitable type of memory (e.g., such as, for example, RAM, ROM, programmable read-only memory (PROM), erasable programmable read-only memory (EPROM), electrically erasable programmable read-only memory (EEPROM), any type of tangible and non-transitory storage medium), where the files that comprise an operating system, application programs, public keys, and/or data files may be stored.

Application 136 may include instructions that, when executed, instructs second device 130 to request a user log into the application, connect to a backend system, such as backend system 140, encrypt a handshake using a stored public key, and/or transmit the encrypted handshake to a first device, such as first device 120. Microprocessor 138 may store and/or execute firmware and/or software applications stored in second device 130, such as application 136.

Backend system 140 may include an input/output interface 142, data storage 144, and/or a processor 146. Input/output interface 142 may include for example, I/O devices, which may be configured to provide input and/or output to/from backend system 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of backend system 140 and a bus that allows communication among the various components of backend system 140. Input/output interface 142 may include a display, which may include for example output devices, such as a printer, display screen monitor, television, and the like), speakers, projector, and the like, Although not shown, backend system 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Data storage 144 may include random access memory (RAM) and read only memory (ROM), which may be configured to access and store data and information and computer program instructions, such as firmware and/or other applications. Data storage 144 may also include storage media or other suitable type of memory (e.g., such as, for example, RAM, ROM, programmable read-only memory (PROM), erasable programmable read-only memory (EPROM), electrically erasable programmable read-only memory (EEPROM), any type of tangible and non-transitory storage medium), where the files that comprise an operating system, application programs, private/public keys, device (e.g., first device and/or second device) identifiers, connection data (e.g., valid handshake data, timestamps associated with handshake attempts, and/or the like) and/or data files may be stored. Processor 146 may store and/or execute firmware and/or software applications stored in backend system 140 as described herein.

Figure 2:
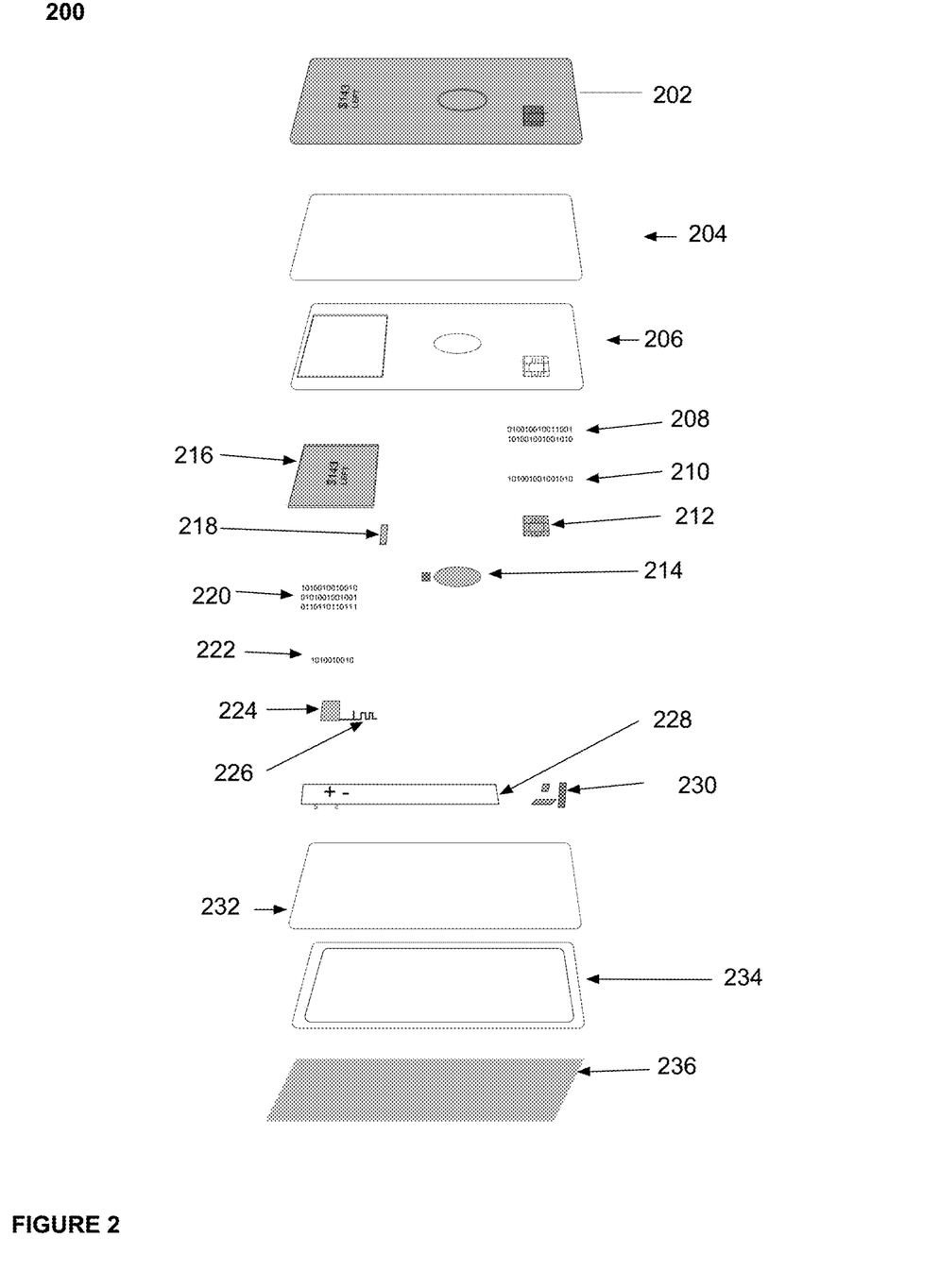
FIG. 2 depicts an example device comprising user-specific, automated Bluetooth pairing using a pre-stored private key, according to embodiments of the disclosure.

FIG. 2 depicts an example dynamic transaction card 200. A dynamic transaction card 200 may be similar to first device 120 and may be connected to a second device, such as second device 130 via a Bluetooth and/or BLE connection.

As shown in FIG. 2, dynamic transaction card 200 may include a top output layer 202. Dynamic transaction card 200 may include a transaction card as described in U.S. Provisional Patent Application 62/147,568, which is incorporated herein by reference. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polyactic acid (PLA), acrylonitrile butadiene styrene (ABS), polyethylene terephthalate (PET), Polyethylene terephthalate glycol-modified (PET-G), and/or the like. A dynamic transaction card 200 may further include a top protective layer 204, such as scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass material, PVC, PET, and/or PET-G.

A dynamic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the internal components of card 200. For example, injection molding may include ABS, then plastic elastomers (TPE), thermoplastic vulcanizate (TPV), thermoplastic polyurethane (TPU), PET, polycarbonates (PC), and/or silicone.

A dynamic transaction card 200 may further include a Java Applet 208 and Java Applet integration 210 Although a Java Applet 208 is used through the specification, any other similar type of code application may be used. Moreover, although Java Applet integration 210 is used throughout this specification, any type of interface may be used to allow the microcontroller to interact with the EMV chip. A Java Applet 208 may include code that executes payments, such as payment made using an EMV chip. A Java Applet 208 may include code that executes Bluetooth and/or BLE connections as described herein. A Java Applet 208 may include account-provider specific code to execute display functionality specific to the account provider. Java Applet integration 210 may include coded interfaces to allow the microcontroller to interact with the EMV chip 212.

An EMV chip 212 may include a number of contacts that may interact with a terminal. During an EMV interaction, application cryptograms may be used to send and receive data packets between the dynamic transaction card 200 and a terminal. For example, data packets may include user authentication information which a acquisition system and/or issuing financial institution may use to authenticate a transaction card 200 during a transaction. Various cryptographic protocols and/or methods may be used in this data transmission and reception process. Moreover, during a transaction issuing financial institutions and/or acquisition systems may return script commands to the EMV chip 212 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

EMV chip 212 may act as a element, such as secure element 126. As a secure element EMV chip 212 may store a private key used to validate an encrypted handshake received from a second device, such as second device 130. EMV may store a private key in memory, such as memory 126c. EMV chip 212 may include an applet, such as applet 126b, that provides instructions that, when executed, decrypt a received encrypted handshake in order to validate and/or create an attempted Bluetooth and/or BLE connection as described herein.

Dynamic transaction card 200 may also include one or more sensors 214 to receive input. Sensors 214 may include an activation sensor and/or an operation sensor, which may be combined and/or separate. An activation sensor may activate the dynamic transaction card 200 and an operation sensor may instruct the dynamic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the dynamic transaction card and/or a password received on a paired mobile device), and/or the like. An operation sensor may change a display 216 based on received input, conduct a transaction via, for example an EMV chip 212 and/or contactless payment technologies based on received input, attempt a pairing of a card 200 and a mobile device, and/or the like.

By way of example, a sensor 214 may include a capacitive touch sensor, a piezoelectric sensor, load cells, a light sensor, a temperature sensor, a resistive touchscreen, including for example an analogue matrix real (AMR) sensors, and/or the like. Sensors 214 may include accelerometers to detect motion input.

Although the sensor 214 is depicted at a particular spot in the transaction card 200, a sensor 214 may be placed at any portion of the card to detect, for example, touch, light, heat, energy, and/or the like. For example, a sensor may be placed around the outer edges of a dynamic transaction card 200 or at any spot within the dynamic transaction card 200. Sensor 214 also may include the entire exterior surface of transaction card 200.

A display 216 may be provided within the transaction card 200. Although the display as shown includes, for example, a dot matrix display, a number of other display options may be included in the transact on card 200. For example, lighting, such as LED lighting, OLED lighting, and/or the like, may be used as display components, Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered and/or modified, for example, where dynamic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered and/or modified when, for example, a dynamic transaction card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an a count holder's mobile device via a network, and then from an account holder's mobile device to electronic card 200 via a wireless connection. A display may also be altered and/or modified when electronic card 200 activates a new account. For example, when an account holder applies for a new account (e.g., a new credit card account, a new checking account, and/or the like), if approved, new account data may be transmitted to electronic card 200. New account data may be received at an account holder's mobile device from an issuing financial institution via a network (e.g. using a mobile application, mobile optimized website, and/or the like). New account data may then be transmitted from an account holder's mobile device to electronic card 200 via a wireless connection (e.g., BLE, RFID, WiFi, and/or the like) or a contact connection (e.g., using a terminal in contact with an EMV chip and/or other microchip). This connection may be made using the processes described herein.

A dynamic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A dynamic transaction card 200 may include firmware 220 and/or a bootloader 222. A bootloader 222 may include code to be executed as an electronic card 200 is activated and before any operating system, firmware, or other code is executed on the dynamic transaction card 200. A bootloader may be activated via a sensor 214 and energy storage component 228 of the dynamic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Card 200 may also be activated using program code that may be flashed directly to a microprocessor such as microcontroller 224, EMV chip 212, and/or the like. Card 200 may no use a bootloader 222 but instead may cycle between a sleep state and an active state using program code and/or memory.

A dynamic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Antenna 226 may facilitate the Bluetooth and/or BLE connections described herein.

Microcontroller 224 may communicate with EMV chip 212, Java Applet 208, Java Applet integration 210, sensor(s) power management 230, antenna 226, energy storage component 228, display 216, display driver 218, firmware 220, bootloader 222, and/or any other component of dynamic transaction card 200. Microcontroller 224 may control the card operations to conduct transactions and/or display data as described throughout this specification.

Dynamic transaction card 200 may include an energy storage component 228 and a PCB 232. By way of example, energy storage component 228 may include a lithium polymer battery, a lithium-metal battery, lithium-ceramic battery, and/or any other type of battery. Battery 228 may be constructed out of rigid materials, semi flexible materials, and/or flexible materials. Energy storage component 228 may provide power to card components contained within dynamic transaction card 200. Energy storage component 228 may be a combine battery/potting component to support dynamic transaction card 200.

Dynamic transaction card 200 may include a power management component 230 that may manage the charging and discharging of energy storage component 228. Power management component 230 may convert voltage to a predetermined level in order to operate dynamic transaction card 200 as discussed throughout the specification. Power management component 230 and/or energy storage component 228 may include, for example, solar power cells to convert solar energy into an electrical current within a solar panel. Power management component 230 and/or energy storage component 228 may include connections to sensors 214 to receive input and activate dynamic transaction card 200 (e.g., motion input, thermal input, manual input, touch input, and/or the like).

A flexible printed circuit board (PCB) 232 may be included in dynamic transaction card 200. flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB 232 may include electronic components and connections that power dynamic transaction card 200. Flexible PCB 232 may control and/or provide integration between the components of card 200. For example, flexible PCB 232 mechanically supports and electronically connects the electronic components of card 200 using, for example, conductive tracks, pads, and/or other features. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silkscreened, and/or the like. FPC 232 may be used as a structural member for the electronic components of card 200 and/or for the card system as a whole 200.

Dynamic transaction card 200 may include a chassis 234 as a frame or supporting structure. Chassis 234 may be a mow for a flexible PCB 232 with an integrated energy storage component 228/230 and may be constructed out of flexible or semi-flexible material as well. Chassis 234 may be constructed out of a number of materials, including but not limited to, styrene, polycarbonate, polyester and PET. Chassis 234 may be constructed out of a conductive material. Chassis 234 may increase the rigidity of dynamic transaction card 200 to prevent damage. Chassis 234 may also be used to detect if dynamic transaction card 200 is being held by including sensors 214 around chassis 234.

Where chassis 234 is constructed out of a conductive material, a dielectric constant of chassis 234 and/or card 200 may be monitored to detect handling of card 200. Chassis 234 may be included within or separate from a card backing 236. Card backing 236 may include a magnetic stripe that may be read using a magnetic stripe reader. A magnetic strip may store tracks of data that are used to conduct a transaction using a dynamic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 200 that is paired to a mobile device using the methods described herein via, for example, Bluetooth, BLE, and/or other wireless technologies, may receive new track data. The new track data may be unformatted, encrypted, encoded, and/or the like when the new track data is transmitted from the mobile device to the dynamic transaction card 200.

Upon receipt of the new track data, the new track data may be routed to a microprocessor, such as EMV chip 212 and/or microcontroller 224. EMV chip 212 and/or microcontroller 224 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time upon pairing a dynamic transaction card 200 with a mobile device.

Card backing 236 may be made of similar material to that of the output layer 202 and/or the top protective layer 204. Card backing 236 may be made out of a plastic material.

Although the components of dynamic transaction card 200 are illustrated in a particular fashion, these components may be combined and or placed throughout, for example, a dynamic transaction card 200 it any manner.

Figure 3:
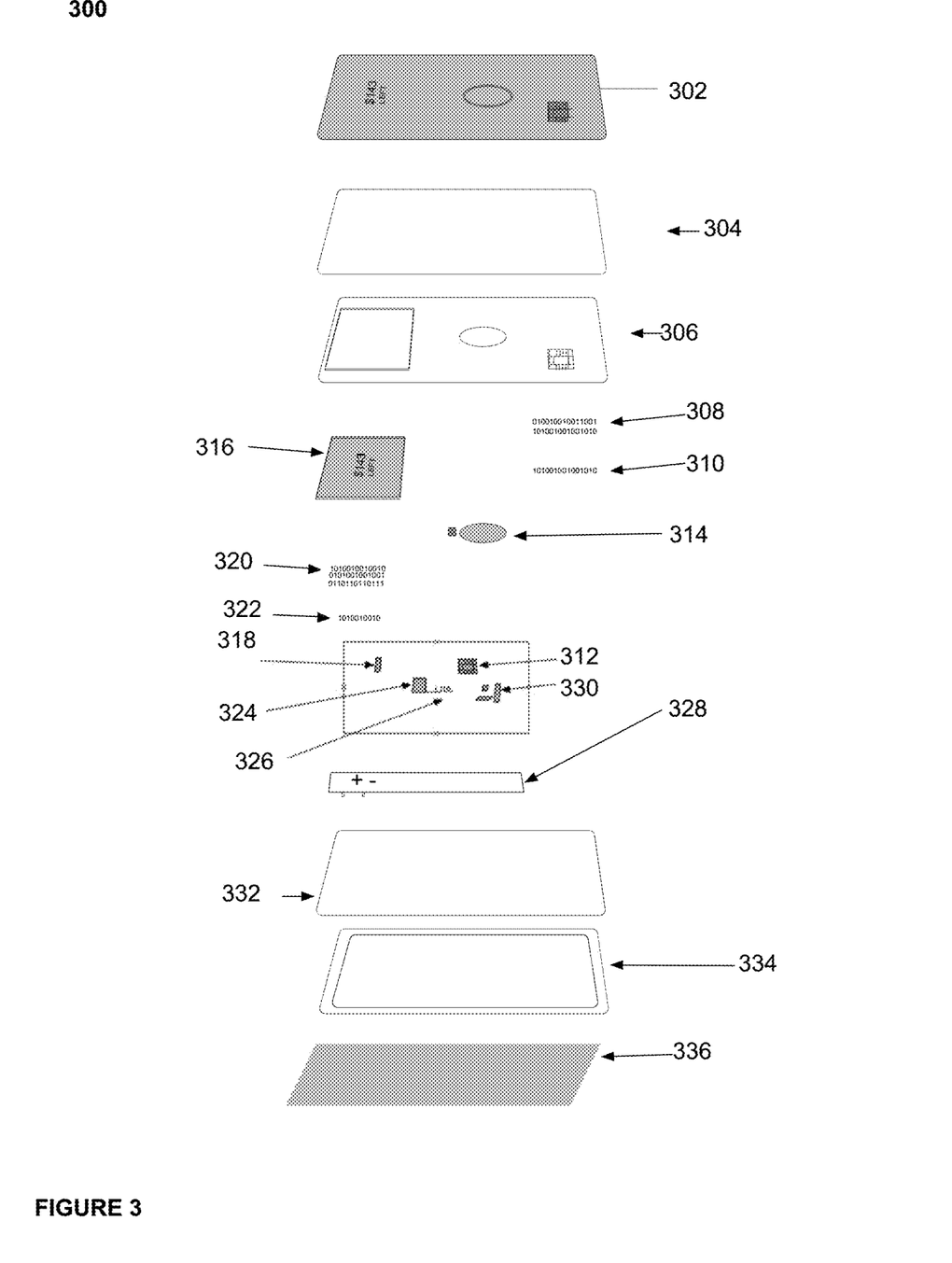
FIG. 3 depicts an example device comprising user-specific, automated Bluetooth pairing using a pre-stored private key, according to embodiments of the disclosure.

For example, FIG. 3 illustrates an electric transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV chip 312 which may be similar to EMV chip 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; energy storage component 328 which may be similar to energy storage component 228; power management 330 which may be similar to power management 230; a flexible PCB 332 which may be similar to flexible PCB 232; chassis 334 which may be similar to chassis 234; and/or card backing 336 which may be similar to card backing 236.

Figure 4:
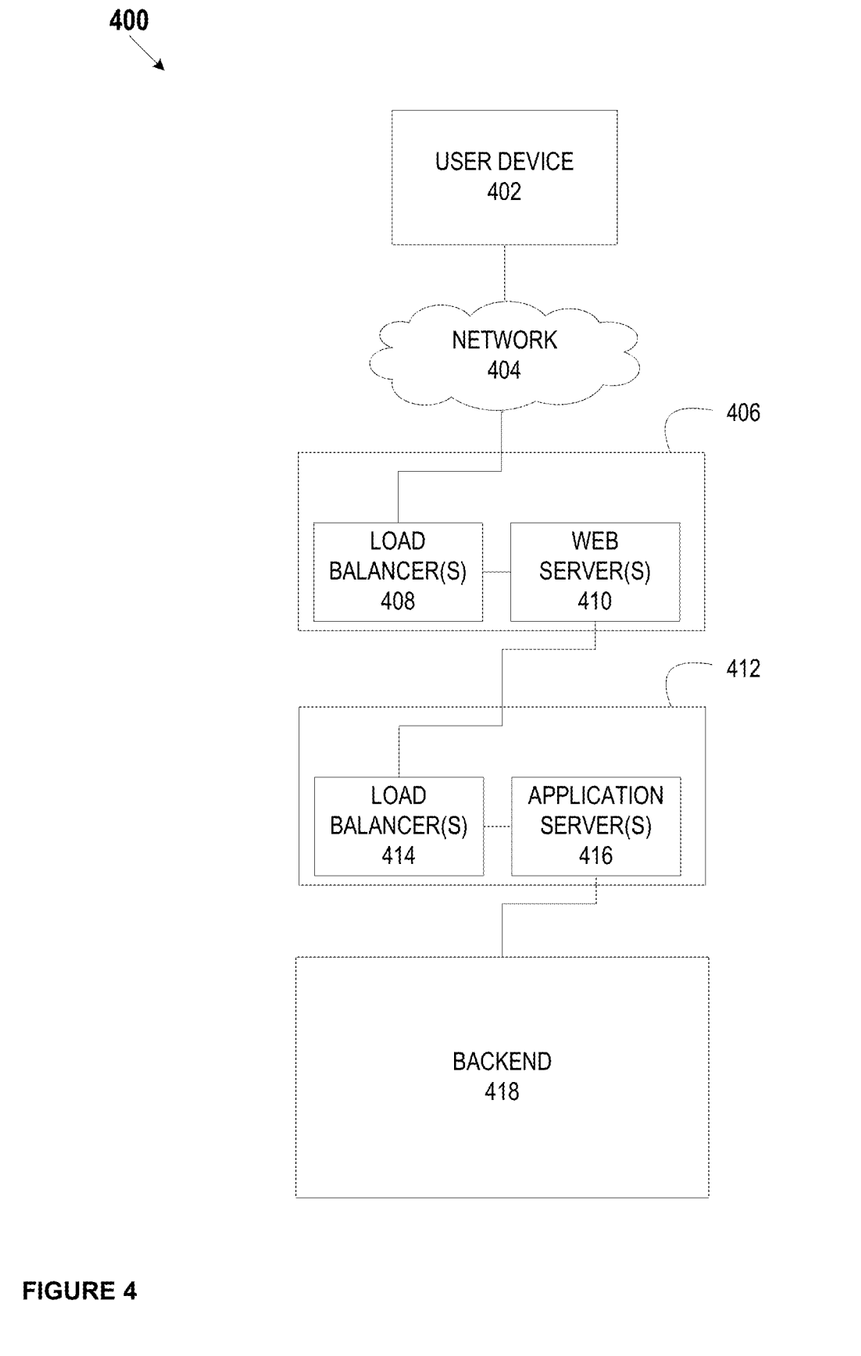
FIG. 4 depicts an example system and device to achieve user-specific, automated Bluetooth pairing, according to embodiments of the disclosure.

Returning to FIG. 1, backend system 140 may include a backend system that communicates with a second device 130. For example, where second device 130 is a mobile device including a financial application, backend system 140 may be a system associated with, for example, a banking service company such as Capital One®, Bank of America®, Citibank®, Wells Fargo®, Sun Trust, various community banks, and the like, as well as a number of other financial institutions such as Visa®, MasterCard®, and American Express® that issue credit and/or debit cards, for example, as transaction cards. In this example, backend system 140 may include and/or be connected to one or more computer systems and networks to facilitate valid Bluetooth and/or BLE connections between a second device and a first device.

Where first device 120 is associated with a dynamic transaction card, backend system 140 may include systems associated with financial institutions that issue transaction cards and maintain a contract with cardholders for repayment. In various embodiments, a backend system 140 may issue a dynamic transaction card. Backend 140 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), electronics companies (e.g., electronics manufacturers, software providers, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.):

Backend system 140 may connect with a second device 130 as described in FIG. 4. For example, system 400 may include a user device 402, which may be similar to second device 130, a network 404, which may be similar to network 110, a front-end controlled domain 406, a back-end controlled domain 412, and a backend 418, which may be similar to backend system 140. Front-end controlled domain 406 may include one or more load balancers 408 and one or more web servers 410. Back-end controlled domain 412 may include one or more load balancers 414 and one or more application servers 416.

User device 402 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 400 may execute one or more software applications to enable, for example, network communications.

User device 402 may include an iPhone, iPod, iPad, and/or Apple Watch from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 404 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, WEE 802.11b, 802.15.1, 802.11n, and 802.11g or any other wired or wireless network for transmitting and receiving a data signal.

In addition, network 404 may include, without limitation, telephone lines, fiber optics, IEEE Ethernet 902.3, a wide area network (WAN), a local area network (LAN) or a global network such as the Internet. Also, network 404 may support an Internet network, a wireless communication network, a cellular network, or the like, or any combination thereof. Network 404 may further include one network, or any number of example types of networks mentioned above, operating as a stand-alone network or in cooperation with each other. Network 404 may utilize one or more protocols of one or more network elements to which they are communicatively couples. Network 404 may translate to or from other protocols to one or more protocols of network devices. Although network 404 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 406 may be implemented to provide security for backend 418. Load balancer(s) 408 may distribute workloads across multiple computing resources, such as, for example computers, a computer cluster, network links, central processing units or disk drives. In various embodiments, load balancer(s) 410 may distribute workloads across, for example, web server(s) 416 and/or backend 418 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 408 may include software that monitoring the port where external clients, such as, for example, user device 402, connect to access various services of a financial institution, for example. Load balancer(s) 408 may forward requests to one of the application servers 416 and/or backend 418 servers, which may then reply to load balancer 408. This may allow load balancer(s) 408 to reply to user device 402 without user device 402 ever knowing about the internal separation of functions. It also may prevent mobile devices from contacting backend servers directly, which may have security benefits by hiding the structure of the internal network and preventing attacks on backend 418 or unrelated services running on other ports, for example.

A variety of scheduling algorithms may be used by load balancer(s) 408 to determine which backend server to send a request to. Simple algorithms may include, for example, random choice or round robin. Load balancers 408 also may account for additional factors, such as a server's reported load, recent response times, up/down status (determined by a monitoring poll of some kind), number of active connections, geographic location, capabilities, or how much traffic it has recently been assigned.

Load balancers 408 may be implemented in hardware and/or software. Load balancer(s) 408 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 410 may include hardware (e.g., one or more computers) and/or software (e.g., one or more applications) that deliver web content that can be accessed by, for example a client device (e.g., user device 402) through a network (e.g., network 404), such as the Internet. In various examples, web servers, may deliver web pages, relating to, for example, online banking applications and the like, to clients (e.g., user device 402). Web server(s) 410 may use, for example, a hypertext transfer protocol (HTTP/HTTPS or sHTTP) to communicate with user device 402. The web pages delivered to client device may include, for example, HTML documents, which may include images, style sheets and scripts in addition to text content.

A user agent, much as, for example, a web browser, web crawler, or native mobile application, may initiate communication by making a request for a specific resource using HTTP/HTTPS and web server 410 may respond with the content of that resource or an error message if unable to do so. The resource may be, for example a file on stored on backend 418. Web server(s) 410 also may enable or facilitate receiving content from user device 402 so user device 402 may be able to, for example, submit web forms, including uploading of files.

Web server(s) also may support server-side scripting using, for example, Active Server Pages (ASP), PHP, or other scripting languages. Accordingly, the behavior of web server(s) 410 can be scripted in separate files, while the actual server software remains unchanged.

Load balancers 414 may be similar to load balancers 408 as described above.

Application server(s) 416 may include hardware and/or software that is dedicated to the efficient execution of procedures (e.g., programs, routines, scripts) for supporting its applied applications. Application server(s) 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 416 may act as a set of components accessible to, for example, a financial institution, or other entity implementing system 400, through an API defined by the platform itself. For Web applications, these components may be performed in, for example, the same running environment as web server(s) 410, and application servers 416 may support the construction of dynamic pages. Application server(s) 416 also may implement services, such as, for example, clustering, fail-over, and load-balancing. In various embodiments, where application servers) 416 are Jaya application servers, the web server(s) 416 may behaves like an extended virtual machine for running applications, transparently handling connections to databases associated with backend 418 on one side, and, connections to the Web client (e.g., user device 402) on the other.

Backend 418 may include hardware and/or software that enables the backend services of, for example, a financial institution, merchant, or other entity that maintains a distributed system similar to system 400. For example, backend 418 may include, a system of record, online banking applications, encryption applications, BLE/Bluetooth connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 418 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. Backend 418 also may be associated with one or more servers that enable the various services provided by system 400. Backend 418 may enable a financial institution to implement various functions associated with reprogramming a transaction card and/or providing data to a transaction card in order to facilitate the connection of a first device to a second device as described herein.

Figure 5:
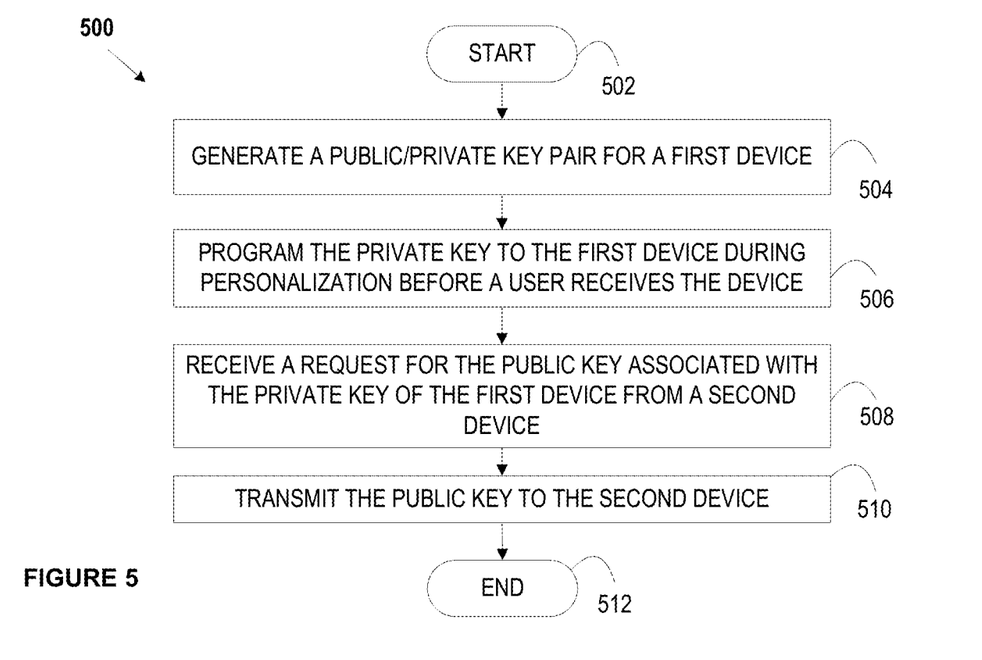
FIG. 5 depicts an example method for incorporating a user-specific, automated Bluetooth pairing of devices using a pre-stored private key in a first device and downloading a public key in a second device, according to embodiments of the disclosure.
Figure 6:
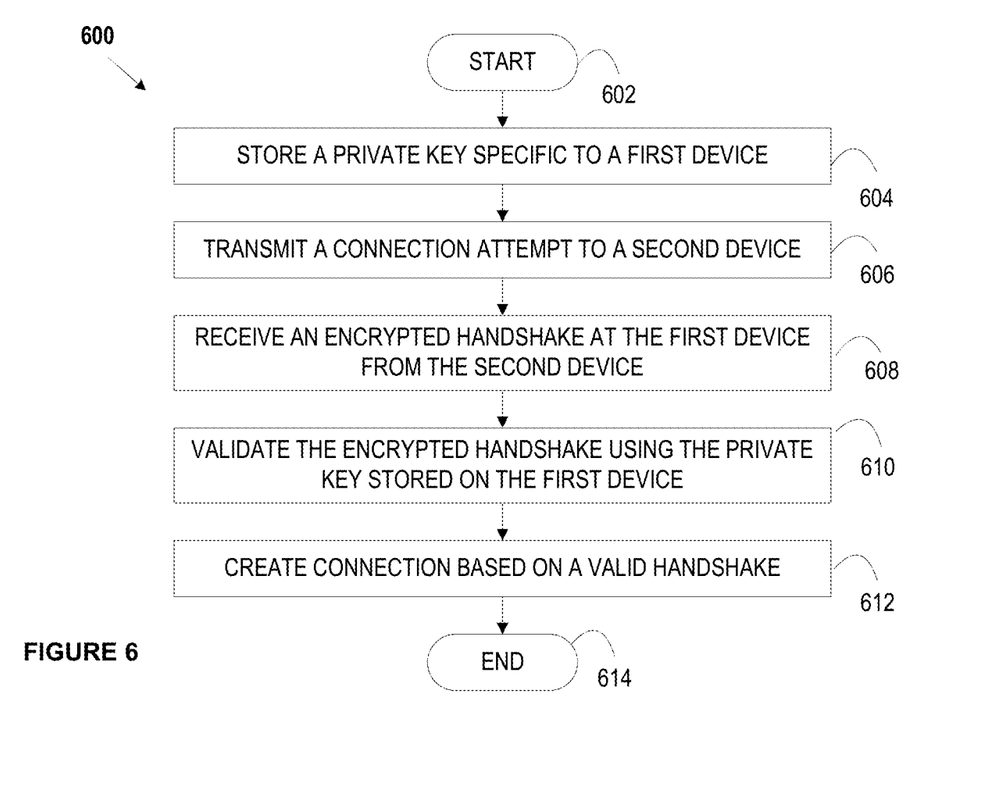
FIG. 6 depicts an example method for incorporating a user-specific, automated Bluetooth pairing of devices using a pre-stored private key in a first device and downloading a public key in a second device, according to embodiments of the disclosure.

In an example embodiment, Bluetooth and/or BLE connection may be made between a first device, such as first device 120, and second device, such as second device 130, with the facilitation of a backend system, such as backend system 140, as described in FIGS. 5 and 6.

For example, process 500 may begin at block 502. At block 504, a backend system may generate a public/private key pair and may assign that public/private key pair to a particular account. A particular account may be associated with a first device.

A backend system may store preprogrammed data such as private keys, UUIDs, and/or other device identifiers that may be associated with a particular account. The backend system may store public keys, account numbers, account names, user names, passwords, and other account data associated with a particular account. The storage may associate the private keys, UUIDs, other device identifiers, public keys, account numbers, account names, user names, passwords, and/or other account data. A backend system may store any data as a hash value.

At block 506, the private key in the public/private key pair assigned to a particular account may be programmed into a first device associated with the particular account. A private key may be programmed into the microcontroller, and/or a secure element which may comprise a microprocessor, memory, and/or an applet in the first device. Memory may store at least one private key used to validate and/or create a Bluetooth and/or BLE connect on with a second device. An applet may include instructions stored therein, that when executed, initiate a Bluetooth and/or BLE connection as described herein. The first device may then be issued to a user.

Upon receipt of the first device, a user may log into an account on a second device via an application and/or applet on the second device. An application on the second device may include instructions that, when executed, instructs a second device to request a user to log into an account associated with the first device (e.g. customer account, a financial account, an employee account, and/or the like) in order to initiate a Bluetooth/BLE connection. The account logged into via the second device may be the same account associated with the first device. A user may then request a Bluetooth and/or BLE connection between the second device and the first device. A second device user may enter login credentials via the second device, which may then be transmitted to a backend system.

In block 508, a backend system may then receive a request from the second device for the public key associated with the account the user logged into. A backend system may validate the login credentials.

At block 510, in response to receiving and validating the login credentials, the backend system may transmit the public key to the second device. The public key may be transmitted in an encrypted format. The second device may then encrypt a handshake and transmit this encrypted handshake to the first device in order to validate the first device. A handshake may consist of a static string with a string of random length with random digits. For example, a handshake may include the string "HelloWorld" and a random length of random digits. A static string may be unique for each device.

The first device may attempt to decrypt this encrypted handshake using the private key securely stored in the first device. If the first device is successful at decrypting the handshake, the handshake will be verified and a Bluetooth and/or BLE connection may be created between the first and the second device using the data in the handshake. In this manner, the Bluetooth and/or BLE API is not needed to create a connection between the first and the second device. If the handshake is not validated, a connection may not be made and/or it may be dropped between a first device and a second device. The results of this connection may be transmitted from the second device to a backend system for record keeping.

By creating this connection, a first and second device may be paired as a first and second device may exchange security features to effectively pair the two devices. By exchanging security features, the first and second device may set up a trust and gather encryption keys ready for the future data exchange. In this manner, the bonding of the devices for a BLE connection may be facilitated. For example, bonding, which may include an exchange of a longer term key, may only occur after pairing, whereby keys may be stored for later use. This process may end at block 512.

In an example embodiment, this process 600 is described from the viewpoint of the first device. The process 600 may begin at block 602. At block 604 a private key may be programmed and stored into a first device associated with an account. A private key may be programmed into the microcontroller, and/or a secure element which may comprise a microprocessor, memory, and/or an applet in the first device. Memory may store at least one private key used to validate and/or create a Bluetooth and/or BLE connection with a second device. An applet may include instructions stored therein, that when executed, initiate a Bluetooth and/or BLE connection as described herein. A first device may then be issued to a user associated with the account.

At block 606, the first device storing the private key may enter advertising mode to attempt to create a Bluetooth/BLE connection. An advertising packet (e.g., advertising PDU) may be transmitted (e.g., in encrypted format). A second device may enter scanning or initiator mode and may receive the advertising packet. A second device may request that a user log into an account associated with the first device (e.g., a customer account, a financial account, an employee account, and/or the like) in order to initiate a Bluetooth/BLE connection. A second device user may enter login credentials via the second device, which may then be transmitted to a backend system. A backend system may receive and validate the login credentials and, in response, transmit a public key to the second device. The public key may be transmitted in an encrypted format. A second device may receive the public key and may use the public key to encrypt a handshake that may be used to validate the first device and create the Bluetooth and/or BLE connection.

At block 608, the first device may receive be encrypted handshake from the second device. The first device may then decrypt the encrypted handshake using the preprogrammed private key in block 610. By decrypting the handshake, the first and second device may engage in a handshake validation. If the first device is successful at decrypting the handshake, the handshake will be verified and a Bluetooth and/or BLE connection may be created between the first and the second device using the data in the handshake at block 612. In this manner, the Bluetooth and/or BLE API is not needed to create a connection between the first and the second device. If the handshake is not validated, a connection may not be made and/or it may be dropped between a first device and a second device. The results of this connection may be transmitted from the second device to a backend system for record keeping. This process may end at block 614.

The present disclosure is not to be limited in term s of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not b construed to imply that the introduction of a claim recitation by the indefinite articles "a" or "an" II s any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

in the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:
1. A system, comprising:
a mobile device comprising:
  a mobile device secure memory;
  a mobile device microprocessor;
  a cryptographic unit associated with the mobile device microprocessor that generates an encrypted handshake using a public key generated by a backend system to be associated with a financial account;
  a mobile device application that, when executed:

requests login credentials for the financial account, the financial account associated with a dynamic transaction card; and
receives the login credentials for the financial account from a mobile device user; and an antenna that:
transmits a request including the login credentials to the backend system to log into the financial account;
transmits a request, subsequent to transmitting the request including the login credentials, to the backend system to receive the public key without a corresponding private key;
receives the public key from the backend system without the corresponding private key;
receives a connection attempt from the dynamic transaction card storing the corresponding private key; and
transmits the encrypted handshake to the dynamic transaction card, wherein the dynamic transaction card includes:
a EuroPay-MasterCard-Visa (EMV) chip having a secure memory storing the corresponding private key;
a dynamic transaction card microprocessor; and
a dynamic transaction card application that, when executed:
transmits the connection attempt to the antenna;
receives the encrypted handshake from the antenna;
decrypts, using the dynamic transaction card microprocessor, the encrypted handshake with the corresponding private key;
validates the encrypted handshake; and
creates, in response to validating the encrypted handshake, a limited distance communication connection between the dynamic transaction card and the antenna.

2. The system of claim 1, wherein the validation of the encrypted handshake is based at least in part on a public/private key pair generated by the backend system, and wherein the public/private key pair is assigned to the financial account associated with the dynamic transaction card.

3. The system of claim 1, wherein the antenna receives advertising packets from the dynamic transaction card.

4. The system of claim 3, wherein the advertising packets are in an encrypted format.

5. The system of claim 1, wherein the antenna receives the public key in an encrypted format.

6. The system of claim 1, wherein the encrypted handshake comprises a static string of random length and random digits.

7. The system of claim 1, wherein the antenna transmits results of the connection attempt to the backend system.

8. The system of claim 7, wherein the results comprise timestamps associated with the connection attempt.

9. The system of claim 1, wherein the antenna receives the public key via the mobile device application.

10. The system of claim 1, wherein the limited distance communication connection is a Bluetooth or Bluetooth Low Energy (BLE) connection.

11. The system of claim 10, wherein the antenna is a Bluetooth or BLE antenna.

12. The system of claim 1, wherein the backend system stores at least one of account numbers, account names, passwords, or user names for the financial account associated with the dynamic transaction card.

13. The system of claim 1, wherein the public key is linked to the financial account associated with the dynamic transaction card.

14. A method comprising:
requesting, via an input/output interface of a mobile device, login credentials for a financial account;
receiving, at the input/output interface, the login credentials for the financial account from a mobile device user;
transmitting, via an antenna of the mobile device, a request including the login credentials to a backend system to access the financial account on the backend system;
transmitting, via the antenna and subsequent to transmitting the request including the login credentials, a request to receive a public key without a corresponding private key, the public key being generated by the backend system to be associated with the financial account;
receiving, at the antenna, the public key from the backend system without the corresponding private key;
receiving a connection attempt from a dynamic transaction card storing the corresponding private key;
transmitting an encrypted handshake to the dynamic transaction card, the handshake being encrypted using the public key;
decrypting, via a microprocessor of the transaction card, the encrypted handshake with the corresponding private key;
validating, via the microprocessor of the transaction card, the encrypted handshake; and
creating, in response to validating the encrypted handshake, a limited distance communication connection between the transaction card and the antenna.

15. The method of claim 14, further comprising receiving, via the antenna, advertising packets from the dynamic transaction card, wherein the advertising packets are in an encrypted format.

16. The method of claim 14, further comprising validating the encrypted handshake based at least in part on a public/private key pair generated by a backend system associate with the financial account.

* * * * *